(12) United States Patent
Rickis et al.

(10) Patent No.: US 11,703,134 B2
(45) Date of Patent: Jul. 18, 2023

(54) METERING VALVE WITH MID-STROKE SHUTOFF

(71) Applicant: Hamilton Sundstrand Corporation, Charlotte, NC (US)

(72) Inventors: Aaron F. Rickis, Longmeadow, MA (US); Lukasz Burek, Portland, CT (US); Sachin Ramprashad, West Hartford, CT (US); Steve Doerner, Enfield, CT (US); Wayne S. Johnson, Jr., West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 64 days.

(21) Appl. No.: 17/408,212

(22) Filed: Aug. 20, 2021

(65) Prior Publication Data

US 2023/0058118 A1      Feb. 23, 2023

(51) Int. Cl.
| | |
|---|---|
| *F16K 11/07* | (2006.01) |
| *F02C 7/232* | (2006.01) |
| *F02C 9/26* | (2006.01) |
| *F16K 31/122* | (2006.01) |

(52) U.S. Cl.
CPC .......... *F16K 11/0708* (2013.01); *F02C 7/232* (2013.01); *F02C 9/263* (2013.01); *F16K 31/1221* (2013.01); *F05D 2220/32* (2013.01)

(58) Field of Classification Search
CPC ................. F02C 9/263; F16K 11/0708; F16K 11/0712; F16K 11/0716; F16K 31/1221
See application file for complete search history.

(56) References Cited

U.S. PATENT DOCUMENTS

| | | | |
|---|---|---|---|
| 3,638,885 A | | 2/1972 | Reed |
| 4,719,749 A | | 1/1988 | Greune et al. |
| 4,751,942 A | * | 6/1988 | Dyer ...................... G05D 7/014 |
| | | | 137/599.08 |
| 5,433,237 A | | 7/1995 | Kao et al. |
| 5,448,882 A | | 9/1995 | Dyer et al. |
| 5,772,182 A | | 6/1998 | Stambaugh, Sr. et al. |
| 6,390,129 B2 | | 5/2002 | Jansen et al. |
| 6,401,446 B1 | | 6/2002 | Gibbons |
| 6,422,021 B1 | | 7/2002 | Futa, Jr. et al. |
| 8,739,544 B2 | | 6/2014 | Rawlinson et al. |

(Continued)

FOREIGN PATENT DOCUMENTS

EP      1106833 A1      6/2001

OTHER PUBLICATIONS

European Search Report for EP Application No. 22189311.8 dated Jan. 20, 2023.

(Continued)

*Primary Examiner* — Scott J Walthour
(74) *Attorney, Agent, or Firm* — Carlson, Gaskey & Olds, P.C.

(57) ABSTRACT

A metering valve has a shutoff position at which it blocks flow from the metering valve outlet line from reaching an outlet to a use. A spool has a first end and a second end. The housing has a first shoulder associated with the first end and a second shoulder associated with the second end. In the shutoff position, the spool has the first end spaced from the first shoulder, and the second end spaced from the second shoulder. A fuel system for a gas turbine engine is also disclosed.

17 Claims, 6 Drawing Sheets

(56) References Cited

U.S. PATENT DOCUMENTS

| | | |
|---|---|---|
| 9,399,953 B2 | 7/2016 | Ballard et al. |
| 2002/0184884 A1 | 12/2002 | McCarty |
| 2005/0217236 A1 | 10/2005 | Wernberg et al. |
| 2010/0257867 A1 | 10/2010 | Aurousseau et al. |
| 2014/0345694 A1* | 11/2014 | Ballard .................. F02C 7/232 |
| | | 137/625.13 |
| 2018/0209344 A1 | 7/2018 | Brocard et al. |

OTHER PUBLICATIONS

European Search Report for EP Application No. 22190597.9 dated Jan. 27, 2023.

\* cited by examiner

METERING VALVE WITH MID-STROKE SHUTOFF

BACKGROUND OF THE INVENTION

This application relates to a metering valve that can operate in a minimum flow position as a failsafe step.

Metering valves are used in any number of applications. In one application a metering valve is incorporated into a fuel supply system. A fuel supply system may have a number of metering valves, including a metering valve for supplying fuel downstream of a heat exchanger to a fuel tank for a gas turbine engine.

Other metering valves perform other functions. As an example, a metering valve controls the recirculation of fuel at lower power operation of the gas turbine engine to ensure an adequate supply of fuel as a heat sink for a heat exchanger.

There are a number of challenges with providing adequate fluid flow across a metering valve under different conditions.

SUMMARY OF THE INVENTION

A fluid flow system includes a metering valve having a housing including a main inlet port and a failsafe inlet port. A spool is movable within the housing. There is a second supply port through the housing and a metering valve outlet line from the housing connected to a line leading to a shutoff valve. The second supply line communicates to a rear chamber of a piston in the shutoff valve, and to the metering valve outlet line. The shutoff valve has a spring urging the piston to a shutoff position at which it blocks flow from the metering valve outlet line from reaching an outlet to a use. The spool is movable between a shutoff position at which it blocks flow from the main inlet port and the failsafe inlet port from reaching the metering valve outlet line, and blocks flow from the second supply line from moving into the spool, such that the shutoff valve is biased to a shutoff position. The metering valve also is movable to a metering position at which the main inlet port and a main inlet orifice in the spool are aligned. An outlet orifice in the spool is aligned with a main outlet port in the housing such that fluid can be metered to the shutoff valve and passed downstream to the use. The spool has a first end and a second end. The housing has a first shoulder associated with the first end and a second shoulder associated with the second end. In the shutoff position, the spool has the first end spaced from the first shoulder, and the second end spaced from the second shoulder. Control chambers are defined between each of the first and second ends and each of the first and second shoulders. The failsafe inlet port communicates a limited amount of fluid to the metering valve outline line, and to the shutoff valve. The second supply line is communicated to a line passing downstream to the use such that the pressure on the rear chamber of the shutoff valve is lower than the pressure on a front face of the piston. The shutoff valve will allow flow to the line leading to the use. The failsafe inlet orifice communicates a limited amount of fluid to the metering valve outlet line and to the shutoff valve. Again, the pressure on the rear chamber of the shutoff valve is lower than the pressure on a front face of the piston and the shutoff valve will allow flow to the line leading to the use.

A fuel system is also disclosed.

These and other features of the present invention can be best understood from the following specification and drawings, the following of which is a brief description.

DETAILED DESCRIPTION

Figure 1A:
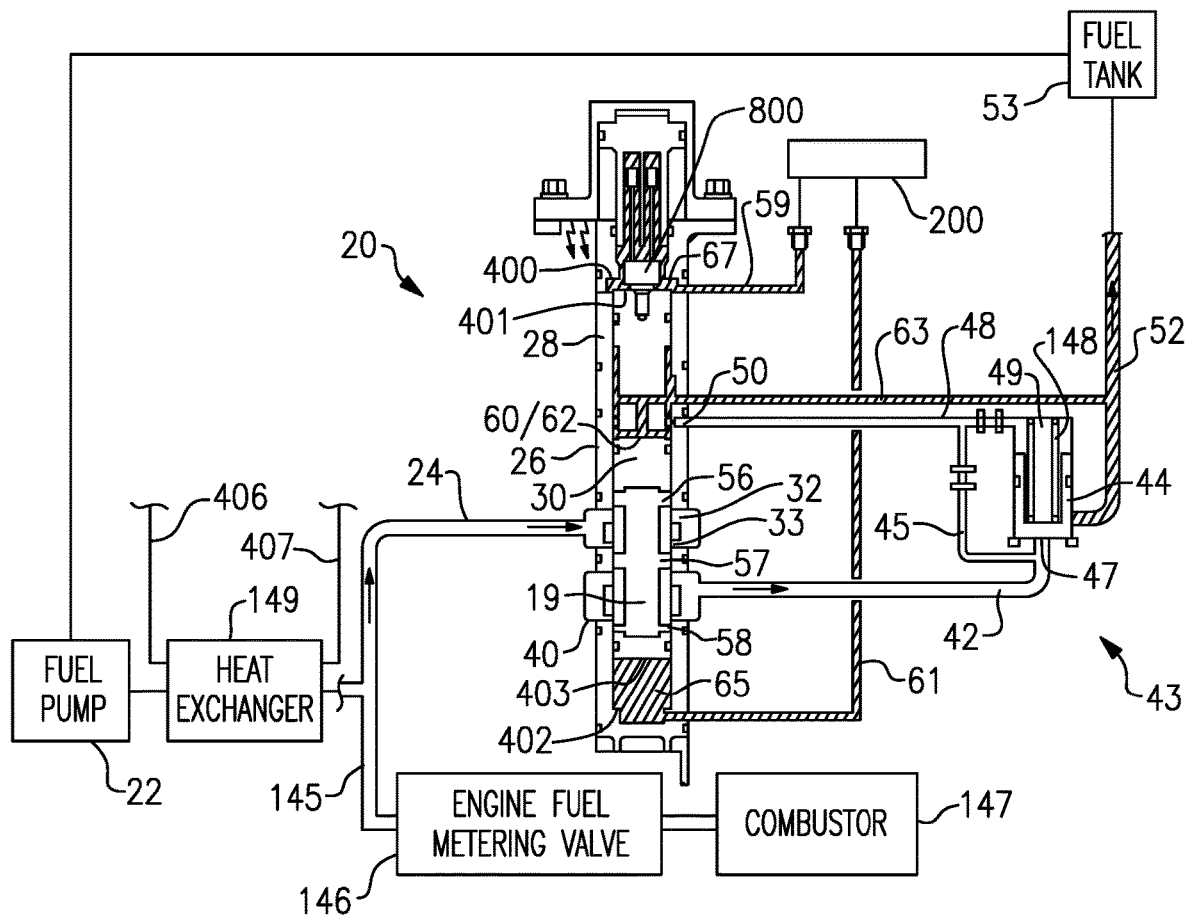
FIG. 1A is a fluid flow system in a first position.

A fluid flow system 20 is illustrated in FIG. 1A at a shutoff position. A fuel pump 22 communicates with a tank 53. Fuel pump 22 supplies fuel to a heat exchanger 149. A connection 406 supplies hot oil to the heat exchanger 149 to be cooled by the fuel and then back through connection 407 to a use. A first branch 145 downstream of the heat exchanger 149 passes through engine fuel metering valve 146 to a combustor 147 in an associated gas turbine engine. A second branch enters into a connection 24 heading to a metering valve 26. Metering valve 26 has a housing 28 including fluid ports and a moving spool 30. The housing 28 has a main inlet port 32 and a failsafe port 33. Fluid communicates from these ports into an interior 19 of the spool 30, and to an outlet orifice 58 in the spool 30. Fluid passes through the spool valve into an outlet port 40 in housing 28 and into a line 42 and to a minimum pressure/shutoff valve 43. A tap 45 communicates fluid from line 42 into a line 48 communicating back with a port 50 in the housing 28. A spring 148 biases a piston 44 to close off the supply of line 42 to a connection 52 leading to a use for the fluid. The use may be fuel tank 53. A forward face 47 of the piston 44 sees the pressure from the line 42 and a rear chamber 49 sees the pressure from the line 48 and a bias force from spring 148. In the FIG. 1A position, the fluid pressure at the face 47 is essentially the same as that at 48, and thus the spring 148 holds the piston 44 in this closed position.

As the speed of the engine increases a greater amount of fuel is supplied to the combustor 147 through the line 145. Thus, the shutoff position of FIG. 1A may be utilized. No fuel will pass through the connection 24 under such conditions. As the speed of the engine slows less fuel is required to be delivered to the combustor 147. However, the heat load on the engine, and thus the heat exchanger 149 remain high, and thus it would be desirable to have increased fuel flow into the connection 24. For this reason, the metering valve 26 has a metering position (see FIGS. 3A and 3B) and the shutoff position (see FIGS. 1A and 1B).

Figure 1B:
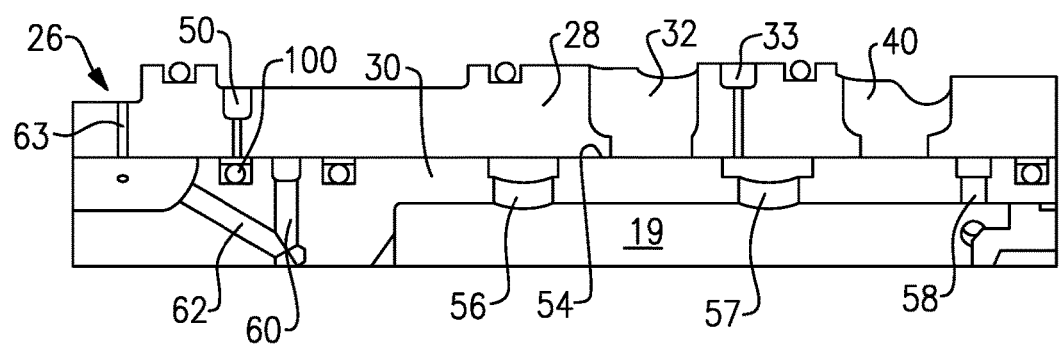
FIG. 1B is a cross-sectional view through a metering valve at the FIG. 1A position.

Valve 26 is shown at the FIG. 1A position in FIG. 1B. The housing 28 has the port 50, the main inlet port 32 and outlet port 40 all shown in a position where they are closed by an outer peripheral surface 54 of the valve spool 30. In addition, a seal 100 closes port 50. No fluid communicates with orifices 56, 57, 58 or 60. As is clear, main inlet port 32 is larger than failsafe port 33.

The FIG. 1A position may be utilized in this application when the main fuel supply to the combustor is large such as at high power operation. Under such conditions, recirculation of fuel to the fuel tank 53 may not be needed.

Control fluid from line 61 is passed to a chamber 65 on one side of the spool 30 and fluid from another source 59 passes into a chamber 67 on an opposed side of the spool to move the spool to a desired position. A control 200, shown schematically, selectively controls the supply of fluid to these chambers.

The control 200 communicates with a control for the overall engine, which may be a full authority digital electric control ("FADEC"). The FADEC would instruct the controller 200 to position the metering valve 26 such that when there is a high volume flow of fuel to the combustor 147, the metering valve 26 may be in the closed position of FIG. 1A. However, at low volume flow to the combustor 147 the control 200 may move the metering valve to meter fuel across the metering valve 26 and back to the fuel tank 53. This ensures an adequate volume of fuel flowing through the heat exchanger 149. The control 200 can accurately position the metering valve 26 at the metering positions of FIGS. 3A and 3B at an infinite number of positions, including a full flow position.

In shutoff position of FIG. 1A, one can see that the spool 30 is at a mid-stroke position. That is, a first end 401 of the spool 30 is spaced from a first shoulder 400 of the housing 28, providing the chamber 67. Further, a second end 403 of the spool 30 is spaced from a second shoulder 402 of the housing 28, providing the chamber 65. In the prior art, the shutoff position is typically at one of the end of stroke positions wherein one of the first or second ends 401 or 403 would be bottomed out on the shoulder 400 or 402. Notably, the end 401 of the spool 30 is defined to not include a transducer 800 which extends from the first end 401. Because the shutoff position is mid-stroke, minimum-stroke and maximum-stroke failsafe positions can be defined as shown in FIGS. 2A/2B/2C/2D, and as described below.

Figure 2A:
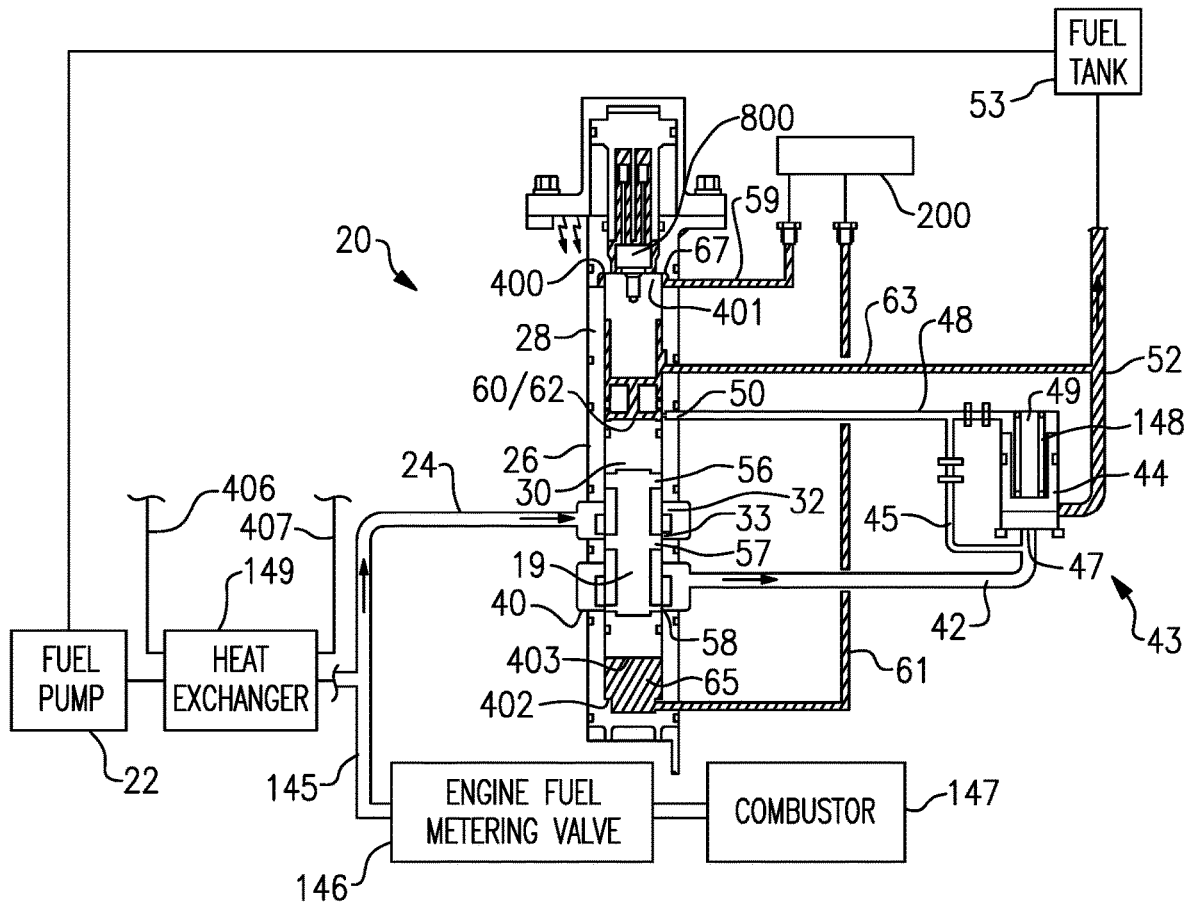
FIG. 2A shows the fluid flow system in a second position.
Figure 2B:
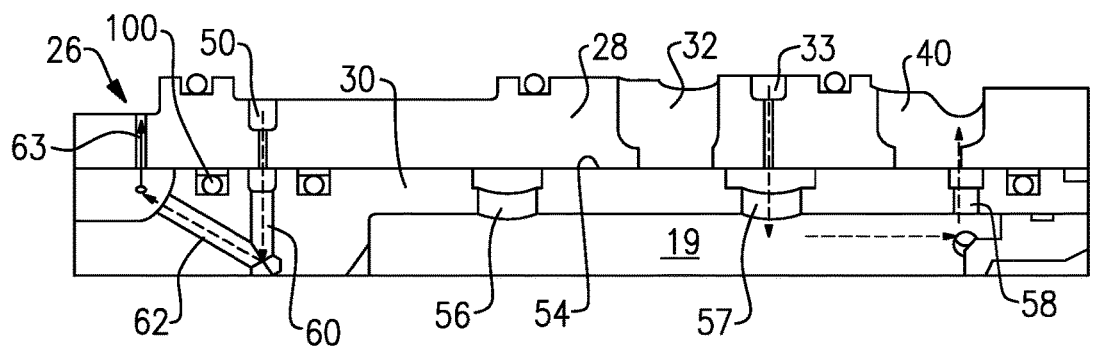
FIG. 2B shows a cross-section of a metering valve at the second flow position.

FIG. 2A shows a minimum-stroke failsafe flow position. This position might occur if the control 200 fails such that the pressure in cavity 65 is always greater than the pressure in cavity 67. The spool is biased to a position at which first end 401 bottoms out on first shoulder 400 due to the presence of pressurized fluid in the chamber 65. This may occur should the control 200 fail, and there is a desire to supply a failsafe fluid flow such that sufficient fluid continues to flow from the heat exchanger. Now, the main inlet port 32 is still closed, but a failsafe port 33 is aligned with the failsafe orifice/metering outlet orifice 57 (it is also aligned in FIG. 1B, but the fluid cannot get to the outlet port 40). In this position, fluid from the source 22 can pass into the failsafe orifice/metering outlet orifice 57 and outwardly of the outlet port 40 through the failsafe outlet orifice 58. This flow then reaches the minimum pressure/shutoff valve 43.

If the connections 45 and 48 were left as in FIG. 1A, the minimum pressure/shutoff valve 43 would still be biased closed. However, in the FIG. 2A/2B position one can see that the port 50, which "sees" the pressure from line 42, is now communicating through passage 62 and back into line 63. Thus, the pressure in the chamber 49 is effectively a lower pressure than that on the face 47. This allows the minimum pressure/shutoff valve 43 to move piston 44 to an open position.

Figure 2C:
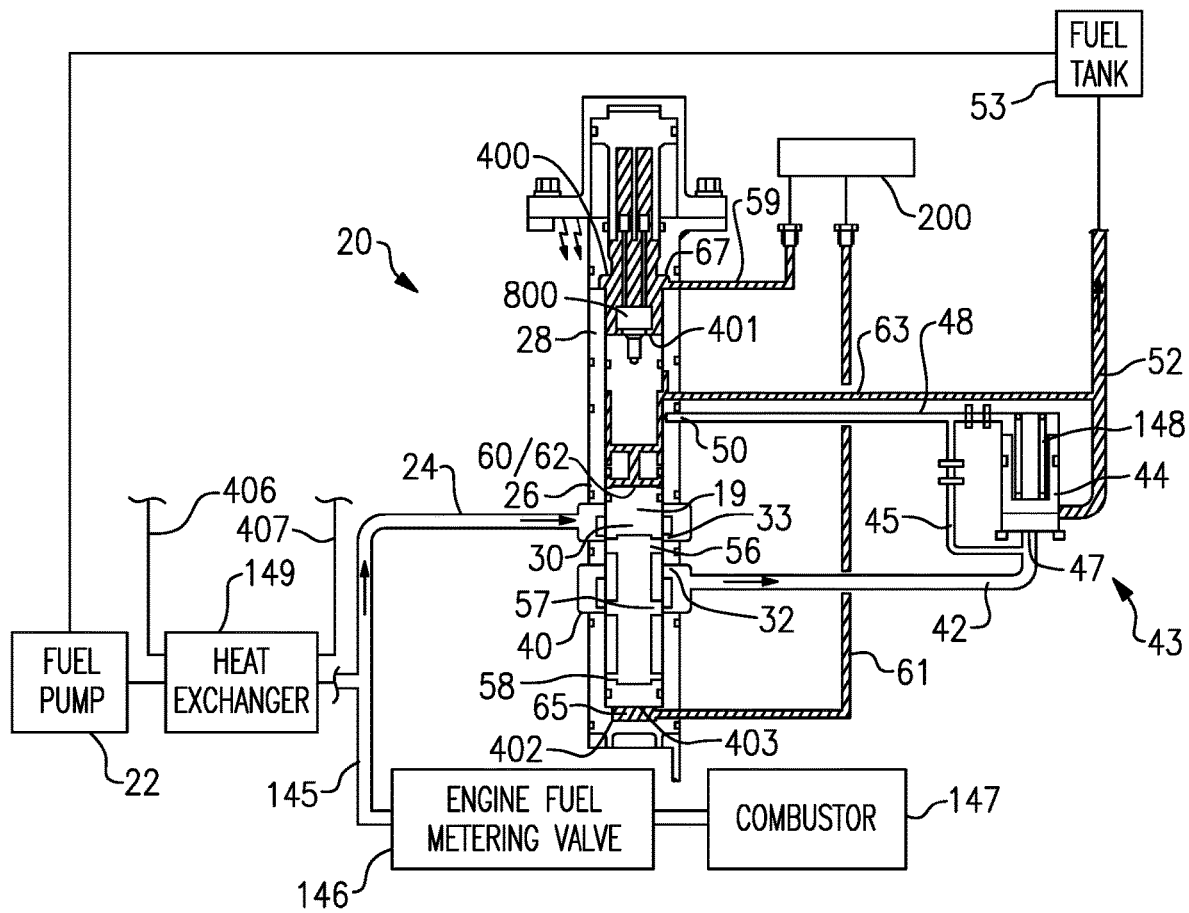
FIG. 2C shows the fluid flow system in a third position.
Figure 2D:
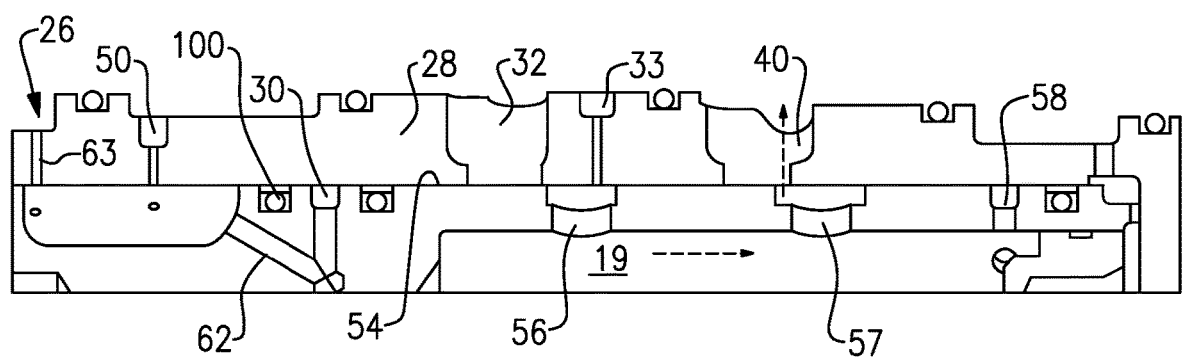
FIG. 2D shows a cross-section of a metering valve at the third flow position.

FIGS. 2C and 2D show a maximum-stroke failsafe flow position at which the orifice 56 communicates with the failsafe port 33, and the orifice 57 communicates with the outlet port 40. As can be seen, connection 50 still communicates to line 63, such that the minimum flow/shutoff valve 43 allows the minimum flow. This position might occur if the control 200 fails such that the pressure in cavity 67 is always greater than the pressure in cavity 65. End 403 of the spool 30 bottoms out on the second shoulder 402 of the housing 28.

Figure 3A:
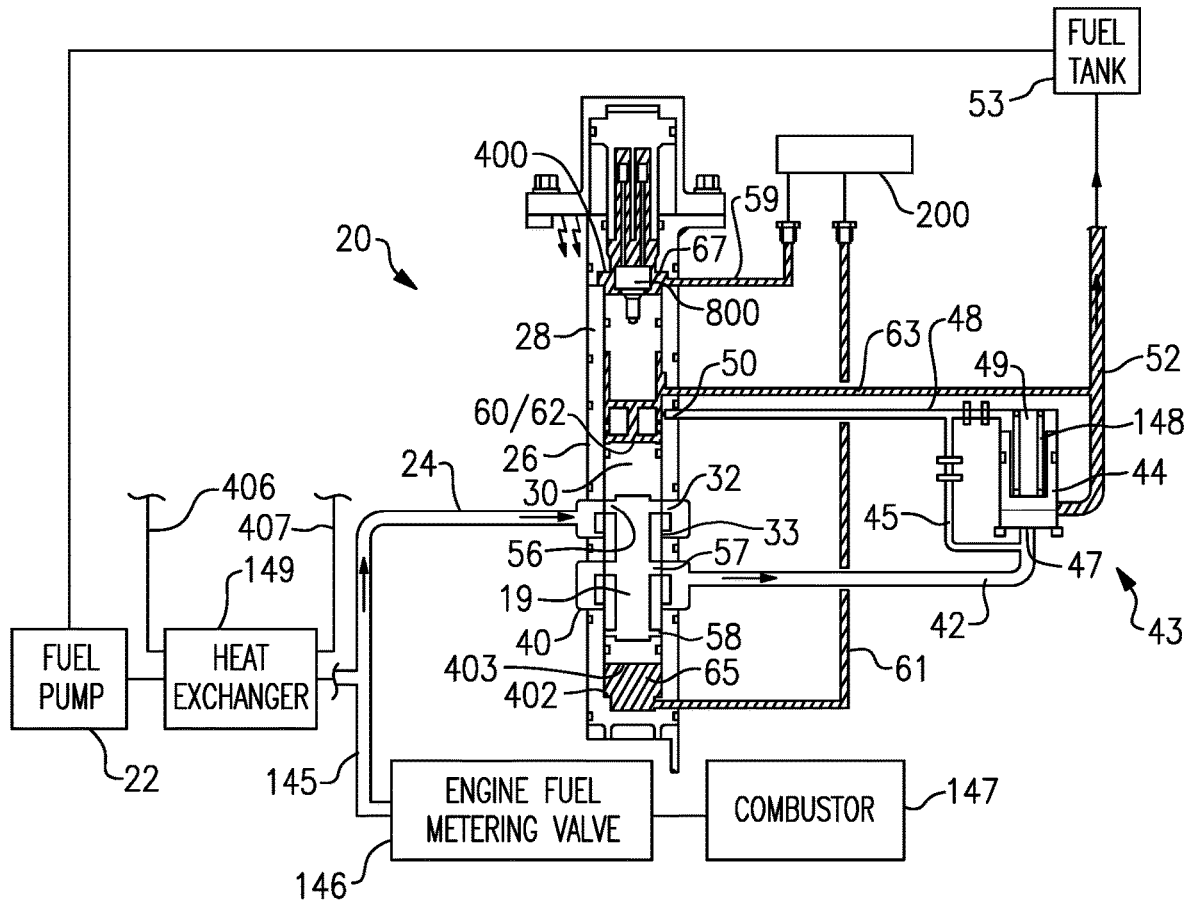
FIG. 3A shows the fluid flow system at a fourth position.

FIG. 3A shows a full open fluid metering position. In this position fluid passes through the main inlet port 32, through the metering inlet orifice 56, and then through the failsafe orifice/metering outlet orifice 57 to the outlet port 40. Spool 30 has an internal cavity 19 connecting metering inlet orifice 56 to the metering outlet orifice 57. This is a fuel metering position which will be utilized to provide a desired amount of fuel during operation of the engine.

Figure 3B:
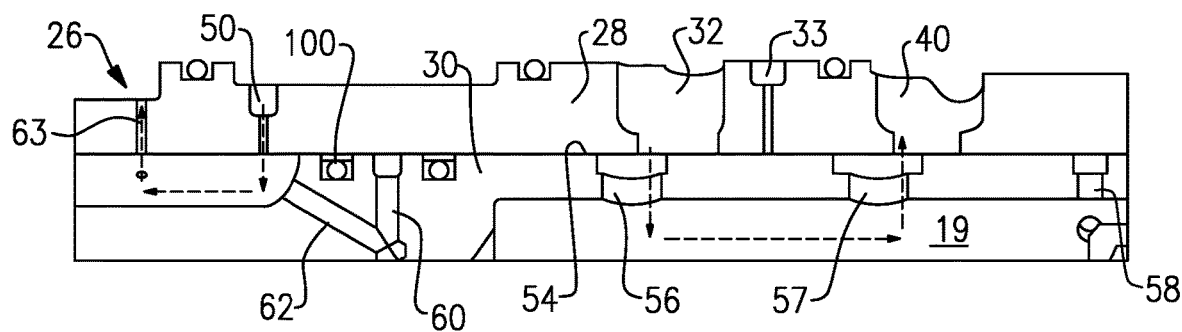
FIG. 3B shows a cross-section of a metering valve at a metering flow position.

FIG. 3B shows an intermediate metering position.

Figure 3C:
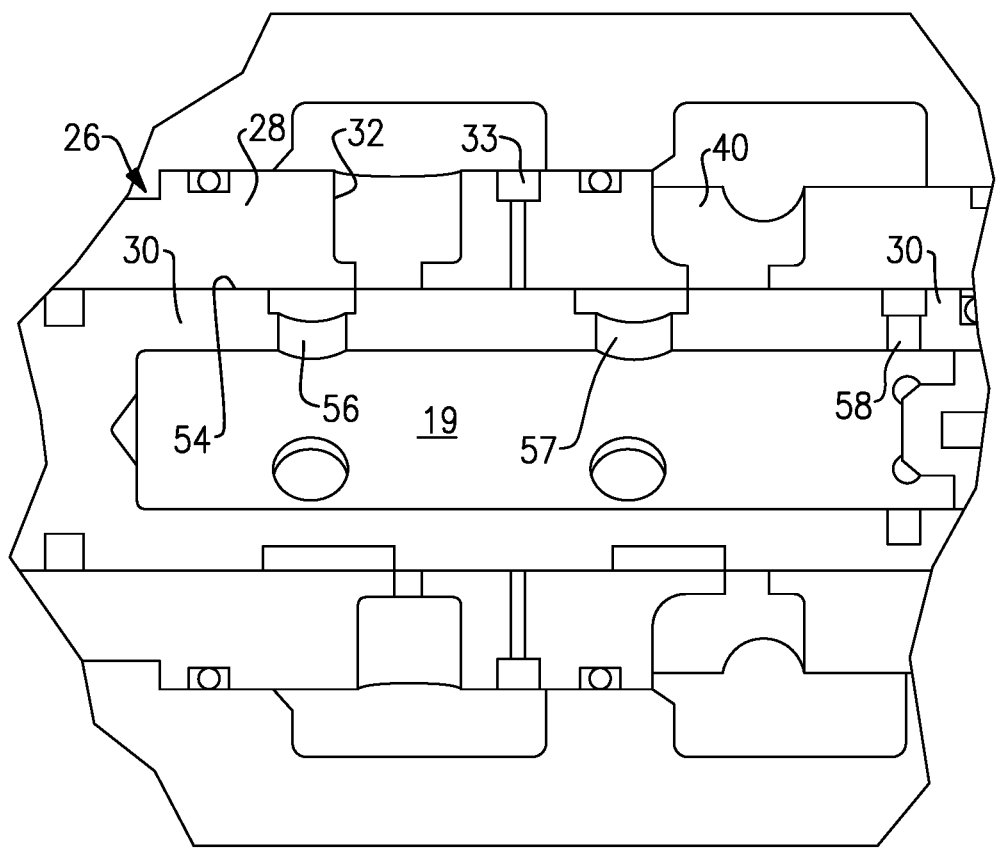
FIG. 3C is an enlarged view of a portion of FIG. 3B at another metering position.

FIG. 3C shows that the timing between the two metering orifices opening occurs simultaneously. Thus, this is the beginning of metering flow.

In one embodiment, Applicant has recognized that it would be desirable to split a pressure drop across the metering valve between serial metering ports. Thus, this is the beginning of metering flow.

The disclosed system can operate at very high pressures, and pressures over say 2000 psi. At such high pressures, a large pressure drop across a single metering orifice could result in cavitation. Thus, in a feature of this disclosure, the two metering orifices 32/56 and 57/40 each provide pressure drop and metering. Thus, the pressure drop may be split between the two. Notably, when the metering inlet orifice 56 initially becomes open to the main inlet port 32, the failsafe orifice/metering outlet orifice 57 is also initially becoming open to the outlet port 40.

The pressure drops across the metering orifices 32/56 and 57/40 act in combination with the minimum pressure/shutoff valve 43 to reduce cavitation. As the valve 43 begins to open, a certain amount of pressure is required to overcome the spring force of spring 148, and open the piston 44. This increases the pressure on the face 47 of the piston 44, and thus the pressure to the outlet of the metering valve 26. In embodiments, a pressure drop ratio can be defined across each of the pairs of orifices 32/56 and 57/40. A pressure drop ratio is defined as: $PDR=(P_{before\_window}-P_{after\_window})/P_{after\_window}$.

In embodiments, the pressure drop ratio across the two pairs of orifices may be equal, although the ratios may also be different.

Figure 3D:
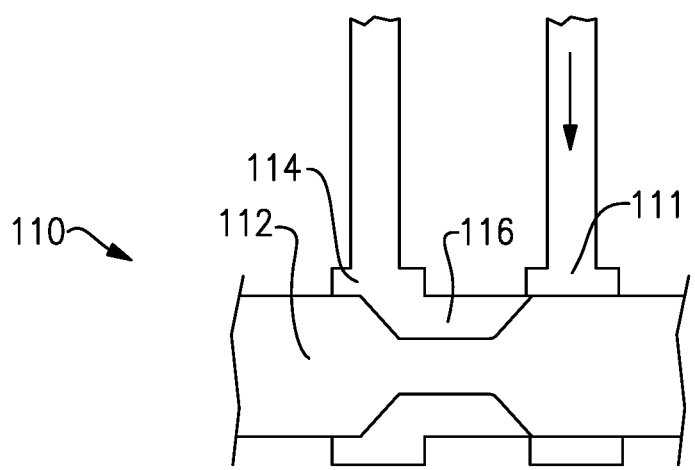
FIG. 3D shows a prior art metering valve.

As shown in FIG. 3D, prior art metering valve 110 had a spool 112 movable within a housing 113, to meter fuel between an inlet 111 and an outlet 114. As is clear, there is a single port 116 connecting the inlet 111 to the outlet 114. In contrast the disclosed spool has internal cavity 19 between orifices 56 and 57 to provide two separate pressure drops. As mentioned above, the disclosure utilizing plural serial metering orifices splits a pressure drop across the two metering orifices, and thus addresses the cavitation concerns as mentioned above.

In embodiments, the two metering orifices can provide different amounts of pressure drop, but they will both provide pressure drop in embodiments of this disclosure. Aspects of this disclosure may be better understood from co-pending U.S. patent application Ser. No. 17/408,183 entitled "Serial Metering Orifices For A Metering Valve," filed on even date herewith and owned by the Applicant for the instant application.

Figure 4:
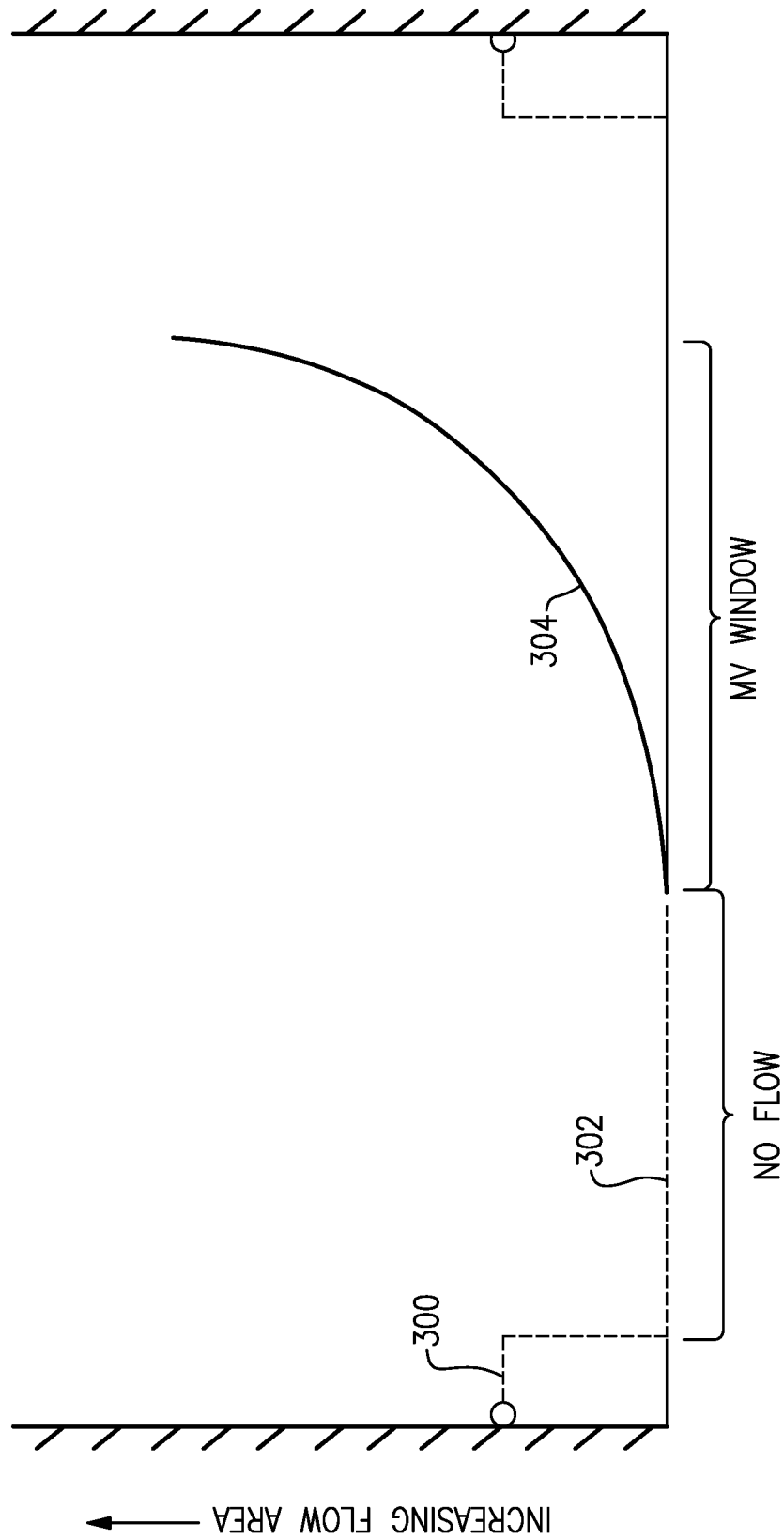
FIG. 4 graphically shows the fluid flow at the three positions.

FIG. 4 is a plot of example relative fluid flows at the three conditions. Level 300 is the volume of fluid flow in the FIG. 2A/2B/2C/2D position. Level 302 is what occurs during the shutoff position of FIGS. 1A and 1B. The increasing amount level 304 is what occurs during metering operation of FIG. 3A-3C.

A fluid flow system under this disclosure could be said to include a metering valve having a housing including a main inlet port and a failsafe inlet port. A spool is movable within the housing. There is a second supply port through the housing and a metering valve outlet line from the housing connected to a line leading to a shutoff valve. The second supply line communicates to a rear chamber of a piston in the shutoff valve, and to the metering valve outlet line. The shutoff valve has a spring urging the piston to a closed position at which it blocks flow from the metering valve outlet line from reaching an outlet to a use. The spool is movable between a shutoff position at which it blocks flow from the main inlet port and the failsafe inlet port from reaching the metering valve outlet line, and blocks flow from the second supply line from moving into the spool, such that the shutoff valve is biased to a shutoff position. The metering valve also is movable to a metering position at which the main inlet port and a main inlet orifice in the spool are aligned. An outlet orifice in the spool is aligned with a main outlet port in the housing such that fluid can be metered to the shutoff valve and passed downstream to the use. The spool has a first end and a second end. The housing has a first shoulder associated with the first end and a second shoulder associated with the second end. In the shutoff position, the spool has the first end spaced from the first shoulder, and the second end spaced from the second shoulder. The control chambers are defined between each of the first and second ends and each of the first and second shoulders. The metering valve has a first failsafe position at which the first end bottoms out on the first shoulder and the failsafe port communicates a limited amount of fluid to the metering valve outline line, and to the shutoff valve. The second supply line is communicated to a line passing downstream to the use such that the pressure on the rear chamber of the shutoff valve is lower than the pressure on a front face of the piston. The shutoff valve will allow flow to the line leading to the use. The metering valve also has a second failsafe position which the second end bottoms out on the second shoulder. The failsafe inlet orifice communicates a limited amount of fluid to the metering valve outlet line and to the shutoff valve. Again, the pressure on the rear chamber of the shutoff valve is lower than the pressure on a front face of the piston and the shutoff valve will allow flow to the line leading to the use.

At the first failsafe position, the failsafe inlet communicates with the main outlet orifice in the spool. At the second failsafe position, the failsafe inlet port communicates with the main inlet orifice.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A fuel system for a gas turbine engine comprising:
 a fuel pump configured to deliver fuel from a fuel tank to a heat exchanger;
 a first branch leading to an engine metering valve to meter fuel heading to a combustor of the gas turbine engine;
 a fluid line downstream of the heat exchanger to communicate the fuel to the first branch;
 a second branch;
 a shutoff valve comprising a sprint, a piston, and a rear chamber of the piston; and
 a bypass metering valve having
  a housing including a main inlet port, a second supply port through the housing, a main outlet port, and a failsafe inlet port, the second branch leading into the main inlet port; and
  a spool having a main inlet orifice and an outlet orifice, a first end, and a second end, the spool movable within the housing,
 a metering valve outlet line connected from the housing to a line leading to the shutoff valve, and
 a second supply line in fluid communication with the rear chamber of the piston and the metering valve outlet line,
 wherein the spring is configured to urge the piston of the shutoff valve to a shutoff position at which the shutoff valve blocks flow from the metering valve outlet line from reaching an outlet to the fuel tank,
 wherein the spool is movable to a shutoff position at which the bypass metering valve blocks flow from the main inlet port and the failsafe inlet port from reaching the metering valve outlet line and additionally blocks flow from the second supply line from moving into the spool such that the shutoff valve is forced into the shutoff position by the spring,
 wherein the spool is also movable to a metering position at which the main inlet port and the main inlet orifice in the spool are aligned and the outlet orifice in the spool is aligned with the main outlet port in the housing such that fluid can be metered to the shutoff valve and passed downstream to the fuel tank,
 wherein in the shutoff position of the bypass metering valve, the first end of the spool is spaced from a first shoulder of the housing associated with the first end of the spool and the second end of the spool is spaced from a second shoulder of the housing associated with the second end of the spool, such that a first control chamber is defined between the first end of the spool and the first shoulder, and a second control chamber is defined between the second end of the spool and the second shoulder;
 wherein the metering valve is movable to:
  a first failsafe position at which:
   the first end bottoms out on the first shoulder and the failsafe inlet port communicates with the main outlet orifice in the spool, and
  a second failsafe position at which:
   the second end bottoms out on the second shoulder and the failsafe inlet port communicates with the main inlet orifice.

2. A fluid flow system comprising:
 a shutoff valve comprising a spring, a piston, and a rear chamber of the piston; and
 a metering valve having:
  a housing including a main inlet port, a second supply port through the housing, a main outlet port, and a failsafe inlet port; and
  a spool having a main inlet orifice and an outlet orifice, a first end, and a second end, the spool movable within the housing,
 a metering valve outlet line connected from the housing to a line leading to the shutoff valve, and
 a second supply line in fluid communication with the rear chamber of the piston and to the metering valve outlet line, and wherein the spring is configured to urge the piston of the shutoff valve to a shutoff position at which the shutoff valve blocks flow from the metering valve outlet line from reaching an outlet to a use, wherein the spool is movable to a shutoff position at which the metering valve blocks flow from the main inlet port and the failsafe inlet port from reaching the metering valve outlet line and additionally blocks flow from the second supply line from moving into the spool such that the shutoff valve is forced into the shutoff position by the spring, wherein the spool is also movable to a metering position at which the main inlet port and the main inlet orifice in the spool are aligned and the outlet orifice in the spool is aligned with the main outlet port in the housing such that fluid can be metered to the shutoff valve and passed downstream to the use, wherein in the shutoff position of the metering valve, the first end of the spool is spaced from a first shoulder of the housing associated with the first end of the spool and the second end of the spool is spaced from a second shoulder of the housing associated with the second end of the spool, such that a first control chamber is defined between the first end of the spool and the first shoulder, and a second control chamber is defined between the second end of the spool and the second shoulder, wherein the metering valve is movable to:
a first failsafe position at which:
the first end bottoms out on the first shoulder and the failsafe inlet port communicates a limited amount of fluid to the metering valve outlet line and to the shutoff valve, and
the second supply line is in fluid communication with a line passing downstream to the use such that a pressure on the rear chamber of the shutoff valve is lower than a pressure on a front face of the piston, and the shutoff valve will allow flow to the line leading to the use; and
a second failsafe position at which:
the second end bottoms out on the second shoulder and the failsafe inlet orifice communicates a limited amount of fluid to the metering valve outlet line and to the shutoff valve, and
the second supply line is in fluid communication with the line passing downstream to the use such that the pressure on the rear chamber of the shutoff valve is lower than the pressure on the front face of the piston and the shutoff valve will allow flow to the line leading to the use.

3. The fluid flow system as set forth in claim 1, wherein the main inlet port in the housing is larger than the failsafe inlet port in the housing.

4. The fluid flow system as set forth in claim 1, wherein the first control chamber and the second control chamber are configured to receive pressurized fluid from a control, wherein the first failsafe position is taken when pressurized fluid is not supplied to the first control chamber, and wherein the second failsafe position is taken when pressurized fluid is not supplied to the second control chamber.

5. The fluid flow system as set forth in claim 4, wherein a seal provided in the spool is aligned with the second supply line when the metering valve is in the shutoff position.

6. The fluid flow system as set forth in claim 5, wherein at the first failsafe position the failsafe inlet port communicates with the main outlet orifice in the spool, and at the second failsafe position the failsafe inlet port communicates with the main inlet orifice.

7. The fluid flow system as set forth in claim 1, wherein a seal provided in the spool is aligned with the second supply line when the metering valve is in the shutoff position.

8. The fluid flow system as set forth in claim 1, wherein at the first failsafe position the failsafe inlet port communicates with the main outlet orifice in the spool, and at the second failsafe position the failsafe inlet port communicates with the main inlet orifice.

9. A fuel system for a gas turbine engine comprising:
a fuel pump configured to deliver fuel from a fuel tank to a heat exchanger;
a first branch leading to an engine metering valve to meter fuel heading to a combustor of the gas turbine engine;
a fluid line downstream of the heat exchanger to communicate the fuel to the first branch; a second branch;
a shutoff valve comprising a spring, a piston, and a rear chamber of the piston; and
a bypass metering valve having:
a housing including a main inlet port, a second supply port through the housing, a main outlet port, and a failsafe inlet port, the second branch leading into the main inlet port; and
a spool having a main inlet orifice and an outlet orifice, a first end, and a second end, the spool movable within the housing,
a metering valve outlet line connected from the housing to a line leading to the shutoff valve, and
a second supply line in fluid communication with the rear chamber of the piston and the metering valve outlet line,
wherein the spring is configured to urge the piston of the shutoff valve to a shutoff position at which the shutoff valve blocks flow from the metering valve outlet line from reaching an outlet to the fuel tank,
wherein the spool is movable to a shutoff position at which the bypass metering valve blocks flow from the main inlet port and the failsafe inlet port from reaching the metering valve outlet line and additionally blocks flow from the second supply line from moving into the spool such that the shutoff valve is forced into the shutoff position by the spring,
wherein the spool is also movable to a metering position at which the main inlet port and the main inlet orifice in the spool are aligned and the outlet orifice in the spool is aligned with the main outlet port in the housing such that fluid can be metered to the shutoff valve and passed downstream to the fuel tank, wherein in the shutoff position of the bypass metering valve, the first end of the spool is spaced from a first shoulder of the housing associated with the first end of the spool and the second end of the spool is spaced from a second shoulder of the housing associated with the second end of the spool, such that a first control chamber is defined between the first end of the spool and the first shoulder, and a second control chamber is defined between the second end of the spool and the second shoulder,
wherein the metering valve is movable to:
a first failsafe position at which:
the first end bottoms out on the first shoulder and the failsafe inlet port communicates a limited amount of fluid to the metering valve outlet line and to the shutoff valve, and
the second supply line is in fluid communication with a line passing downstream to the fuel tank such that a pressure on the rear chamber of the shutoff valve is lower than a pressure on a front face of the piston, and the shutoff valve will allow flow to the line leading to the fuel tank; and a second failsafe position at which:
the second end bottoms out on the second shoulder and the failsafe inlet orifice communicates a limited amount of fluid to the metering valve outlet line and to the shutoff valve, and the second supply line is in fluid communication with the line passing downstream to the fuel tank such that the pressure on the rear chamber of the shutoff valve is lower than the pressure on the front face of the piston and the shutoff valve will allow flow to the line leading to the fuel tank.

10. The fuel system as set forth in claim 9, wherein the main inlet port in the housing is larger than the failsafe inlet port in the housing.

11. The fuel system as set forth in claim 9, wherein the first control chamber and the second control chamber are configured to receive pressurized fluid from a control, wherein the first failsafe position is taken when pressurized fluid is not supplied to the first control chamber, and the second failsafe position is taken when pressurized fluid is not supplied to the second control chamber.

12. The fuel system as set forth in claim 11, wherein a seal provided in the spool is aligned with the second supply line when the bypass metering valve is in the shutoff position.

13. The fuel system as set forth in claim 11, wherein the heat exchanger is upstream from the bypass metering valve.

14. The fuel system as set forth in claim 12, wherein at the first failsafe position the failsafe inlet port communicates with the main outlet orifice in the spool, and at the second failsafe position the failsafe inlet port communicates with the main inlet orifice.

15. The fuel system as set forth in claim 9, wherein a seal provided in the spool is aligned with the second supply line when the bypass metering valve is in the shutoff position.

16. The fuel system as set forth in claim 9, wherein at the first failsafe position the failsafe inlet port communicates with the main outlet orifice in the spool, and at the second failsafe position the failsafe inlet port communicates with the main inlet orifice.

17. The fuel system as set forth in claim 9, wherein a seal provided in the spool is aligned with the second supply line when the bypass metering valve is in the shutoff position.

* * * * *